Patented Aug. 27, 1940

2,212,750

UNITED STATES PATENT OFFICE 2,212,750

METHOD OF TREATING HIDES, SKINS, AND PELTS

Julius Pfannmuller, North Plainfield, N. J., and Hans Schleich, New Dorp, Staten Island, N. Y., assignors to Wallerstein Company, Inc., New York, N. Y., a corporation of New York No Drawing. Application February 16, 1939, Serial No. 256,717

5 Claims. (Cl. 195—6)

This invention relates to a method of treating hides, skins and pelts.

It is an object of the invention to provide a simple and effective method of treating hides, skins and pelts, thereby to put the latter in better condition for subsequent chemical treatments such as hair loosening, bating and tanning. Other objects and advantages of the invention will be apparent from the following description.

According to the present invention we subject the hides, skins or pelts to the action of a solution of urea and subsequently to the action of the enzyme urease, which decomposes the urea. It is to be understood that in referring to urease in specification and claims, we include both the pure enzyme urease and urease as contained in raw or partly prepared materials, unless otherwise specified.

The treatment may take place at various stages in the series of operations to which the skins, hides or pelts are subjected in the production of leather or fur, depending on the end in view. For example, in the case of the production of leather, if it is desired to improve the unhairing operation, the treatment is carried out in connection with the soaking operation prior to the hair-loosening bath. If it is desired to improve the bating operation, the treatment may be carried out in connection with the bating treatment. It may also be duplicated in connection with both soaking and bating operations. In the case of hides, skins or pelts which are to be tanned or tawed with the hair on, for the preparation of furs, the treatment is carried out at any suitable stage prior to tanning. It is particularly advantageous in this connection in that it effects a softening without loosening the hair. While the mechanism of the action obtained is not entirely established, it is believed that the urea taken up by the skins or hides is decomposed in the interior of the skin by the enzyme urease, the cleavage action and products tending to influence or partially break up the dense fibre structure thereby softening the skins or hides.

The softening treatment may conveniently be carried out in the usual paddle reels or drums or in pits or any other normal equipment used in tanneries for treating skins or hides in an aqueous solution, the hides, skins or pelts being subjected to an aqueous bath to which the materials referred to are added.

While the amount of water may vary, depending somewhat upon the equipment used for carrying out the process, a skin-water ratio of 1:3 to 1:5 by weight has been found suitable when working in a paddle reel.

While the amount of urea used may vary, from 1% to 2% based on skin weight gives satisfactory results. Instead of urea, any urea derivative that is decomposed by urease may be used.

The urease may be derived from any suitable animal or vegetable or bacterial source, for example, from soy or jack beans. It may be added in raw or crude form or in a more or less purified form. While the amount may vary in a wide range also according to the urease strength of the preparation used, 50% to 100%, based on urea weight, of a raw form of urease, for instance soy bean flakes, has been found satisfactory.

When hides, skins or pelts are treated as above described, they are in a more softened condition and respond more quickly and readily to subsequent or concurrent chemical treatments.

Thus, in the case of skins treated as described prior to a lime unhairing bath, the lime treatment proceeds more rapidly and the skins take up more lime than is the case when our treatment is not put into effect.

In the case of hides, skins or pelts that are to be tanned with the hair on, the treatment described does not loosen the hair and results in a quicker and more uniform tanning operation.

In the case of unhaired skins treated as described, in connection with bating, the bated skins are softer, the scud looser and the final leather of superior quality.

The following procedures are given by way of example:

Example I

Put 100 pounds salt cured sheep shearlings in a paddle containing about 500 pounds of water at 75° F. After a short paddling add 1.5 pounds urea, previously dissolved, and paddle to mix. After 2 hours add .75 pound ground soy beans or flakes. Paddle to mix. Leave overnight. The skins are then ready for subsequent scourings, pickling etc. operations.

Example II

Dehair 100 pounds goatskins by means of usual lime bath. Put unhaired skins in a paddle containing 400 pounds water at 100° F. Add 0.5 pound of a commercial enzymatic bate and about 2 pounds ammonium sulphate. Paddle to mix. Add 1 pound urea and paddle to mix. After 2 hours, add 0.75 pound of ground soy beans or flakes and paddle to mix. Leave overnight. The skins are then ready for the usual pretanning and tanning operations.

*Example III*

Wash 100 pounds green salted calfskins for 20 minutes. Transfer skins to a paddle containing 450 pounds of water at 76° F. Add 2 pounds of urea and paddle to mix. Leave for 3 hours. Add 1 pound ground soy flakes and paddle to mix. Leave overnight. The skins are then ready for dehairing and subsequent operations.

What is claimed is:

1. The method of treating skins, hides and pelts which comprises subjecting the hides, skins or pelts to the action of an aqueous bath containing a compound selected from the group consisting of urea and those derivatives of urea which are decomposed by urease, and subsequently adding urease to said bath.

2. The method of treating hides, skins and pelts which comprises subjecting the hides, skins or pelts to the action of an aqueous bath containing a compound selected from the group consisting of urea and those derivatives of urea which are decomposed by urease, and subsequently adding ground soy beans to said bath.

3. The method of treating skins, hides and pelts, which comprises subjecting the skins, hides or pelts to the action of an aqueous bath containing urea, subsequently adding urease to said bath and thereafter subjecting the skins, hides or pelts to the action of an unhairing bath containing lime.

4. The method of treating skins, hides and pelts which comprises bating the skins, hides or pelts, adding urea to the bating bath during the bating process, and subsequently adding urease to the bath.

5. The method of treating hides, skins and pelts which comprises soaking the hides, skins or pelts, subjecting the hides, skins or pelts to the action of a hair-loosening bath and, subsequently, to a bating process, and adding to both the soak and the bating bath urea and urease, the urease in each case being added subsequent to the addition of the urea.

JULIUS PFANNMULLER.
HANS SCHLEICH.